(12) United States Patent
Torrison

(10) Patent No.: US 8,475,109 B2
(45) Date of Patent: Jul. 2, 2013

(54) MODULAR DOLLY

(75) Inventor: Mark E. Torrison, Yuba City, CA (US)

(73) Assignee: Escalera, Inc., Yuba City, CA (US)

(*) Notice: Subject to any disclaimer, the term of this patent is extended or adjusted under 35 U.S.C. 154(b) by 247 days.

(21) Appl. No.: 12/862,678

(22) Filed: Aug. 24, 2010

(65) Prior Publication Data

US 2011/0052357 A1 Mar. 3, 2011

Related U.S. Application Data

(60) Provisional application No. 61/272,168, filed on Aug. 25, 2009.

(51) Int. Cl.
*B60P 1/00* (2006.01)
*B62B 5/00* (2006.01)

(52) U.S. Cl.
USPC ........... 414/444; 414/446; 414/448; 414/537; 280/47.2

(58) Field of Classification Search
USPC ............... 414/444, 446, 448, 449; 280/47.16, 280/47.2
See application file for complete search history.

(56) References Cited

U.S. PATENT DOCUMENTS

| | | | | |
|---|---|---|---|---|
| 2,572,945 | A | * | 10/1951 | Quesnoit ...................... 414/480 |
| 3,051,336 | A | | 8/1962 | Felsten |
| 3,411,802 | A | | 11/1968 | Diller |
| 3,804,275 | A | | 4/1974 | Lee |
| 4,166,638 | A | | 9/1979 | De Prado |
| 4,270,880 | A | | 6/1981 | Allard |
| 4,531,752 | A | * | 7/1985 | Diener ....................... 280/47.18 |
| 4,824,313 | A | * | 4/1989 | Miller ........................... 414/346 |
| 5,115,539 | A | | 5/1992 | Lee |
| 5,244,221 | A | * | 9/1993 | Ward ........................... 280/79.7 |
| 5,257,892 | A | | 11/1993 | Branch |
| 5,556,118 | A | * | 9/1996 | Kern et al. ................. 280/47.16 |
| 5,709,397 | A | * | 1/1998 | Hall ........................... 280/47.17 |
| 5,716,061 | A | * | 2/1998 | Sloan et al. ................ 280/43.23 |
| 5,947,491 | A | * | 9/1999 | Meier .......................... 280/47.2 |
| 6,079,941 | A | | 6/2000 | Lee |
| 6,256,812 | B1 | * | 7/2001 | Bartow et al. ..................... 5/86.1 |
| 6,283,698 | B1 | | 9/2001 | Lee |
| 6,386,560 | B2 | | 5/2002 | Calender |
| 6,561,745 | B2 | | 5/2003 | Rountree |
| 6,695,325 | B2 | * | 2/2004 | Carrillo ..................... 280/47.34 |
| 7,389,996 | B2 | | 6/2008 | Dubé et al. |
| 2006/0182578 | A1 | | 8/2006 | Morton |

FOREIGN PATENT DOCUMENTS

GB 2002301 A * 2/1979

OTHER PUBLICATIONS

Website, http://www.escalera.com/, "home page" for Escalera Products, four sheets printed from the internet on May 11, 2009.
Website, http://www.handtrucks.com/?source=googleaw&kwid=dolly%cart&tid=broad, series of hand trucks, carts, dollies, etc., three sheets printed from the internet on May 11, 2009.
Website, http://www.lkgoodwin.com/more_info/stairking_battery_powered_stair_climbing_appliance_truck/stairking_battery_powered_stair_climbing_appliance_truck.shtml, battery powered stair climbing appliance hand truck, three sheets printed from the internet on May 11, 2009.

* cited by examiner

*Primary Examiner* — James Keenan
(74) *Attorney, Agent, or Firm* — Richard C. Litman

(57) ABSTRACT

The modular dolly is a manually operated device facilitating the transport of large, heavy, and/or bulky objects. The dolly includes four smaller wheels and two larger diameter wheel and brake assemblies for temporary installation to the sides of the dolly platform for movement over soft, rough, and/or uneven surfaces. A ramp is removably attachable to the loading end of the platform coplanar therewith to facilitate loading the dolly. The ramp also attaches removably to the opposite anchor end of the platform and normal thereto, to serve as a backstop or anchor for a load placed on the platform. A smaller secondary panel may be installed in the anchor end when the ramp is in use during loading, or may be assembled coplanar to the ramp or platform to lengthen the ramp or platform. The dolly may also be used with a stair-climbing hand truck, forklift, pallet jack, or the like.

11 Claims, 11 Drawing Sheets

MODULAR DOLLY

CROSS-REFERENCE TO RELATED APPLICATION

This application claims the benefit of U.S. Provisional Patent Application Ser. No. 61/272,168, filed Aug. 25, 2009.

BACKGROUND OF THE INVENTION

1. Field of the Invention

The present invention relates generally to manually operated hand trucks, carts, dollies and the like, and particularly to a modular dolly having various repositionable panels and wheels to provide for the loading of large, heavy and/or bulky articles thereon and the transport of such articles over soft, rough and/or uneven terrain. The dolly is also adapted for use as a ramp and with a stair-climbing hand truck.

2. Description of the Related Art

Innumerable dollies, carts, hand trucks, and the like have been developed in the past for various general and specialized purposes. Such devices are generally used for the carriage and transport of relatively large, bulky, and/or heavy articles, e.g., large appliances, console-size office machines such as copiers and the like, etc. Most such devices are relatively simple in their construction and configuration and accordingly have various limitations relating to their use, e.g., lifting large and/or heavy appliances, carrying such appliances over rough and uneven terrain, etc.

Such limitations are readily apparent when attempting to transport a large console-size office machine (copier, printer, document shredder, etc.) to and from its site in an office or the like. The need to lift or move the machine onto and from the dolly is apparent, and is quite strenuous when using a conventional dolly, hand truck or the like. Moving the appliance or machine onto and from a truck (van, pickup, etc.) is also often quite a project with conventional moving equipment. Once the dolly or cart and its appliance are resting on the surface, it is generally necessary to move the loaded dolly across various surfaces that are not compatible with the relatively small diameter wheels generally installed on such dollies, e.g., pavement gutters, expanses of relatively soft grass or gravel, doorway thresholds, etc. Even when each of the above problems has been resolved, it is often necessary to negotiate one or more flights of stairs when delivering or removing such equipment.

Thus, a modular dolly solving the aforementioned problems is desired.

SUMMARY OF THE INVENTION

The modular dolly includes a generally rectangular platform having a relatively small wheel beneath each corner thereof. Two of the wheels are preferably steerable or caster wheels (i.e., wheels mounted on a swivel), and two of the wheels (they may be the same wheels) have selectively operable brakes. A pair of larger diameter wheel and brake assemblies may be selectively attached medially to the sides of the platform to facilitate moving the platform and any load thereon over soft, rough, and/or uneven terrain.

A ramp may be selectively installed or secured to either end of the platform. The ramp is coplanar with the platform when secured to the first or loading end thereof, facilitating the movement of a heavy object up the ramp and onto the platform. The ramp is perpendicular to the platform when secured to the opposite second or anchor end thereof, and serves as a generally vertical anchor or tiedown for the object being transported on the dolly. A smaller or shorter secondary panel may be installed as a perpendicular backstop in the anchor end of the platform in place of the ramp during loading operations or as a coplanar extension of the platform anchor end, or with the ramp in the loading end of the platform as an extension of the ramp. Another optional short platform extension may also be removably attached to the first or loading end of the platform, if desired. The various ramps and panels and their various provisions for attachment to the primary structure also enable the device to be used as a ramp between, e.g., a vehicle (moving truck, etc.) and steps or other structure, as required.

The modular dolly is adapted for use with a conventional stair-climbing hand truck, enabling the dolly to transport a large, heavy, and/or bulky object up or down a flight of steps or stairs when used in combination with the stair-climbing hand truck. Such a stair-climbing hand truck is described in U.S. Patent Publication No. 2006/182,578 (now abandoned), which is hereby incorporated by reference. The stair-climbing hand truck adaptation of the dolly may also be used to lift the dolly using a forklift, pallet jack, or other similar device.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
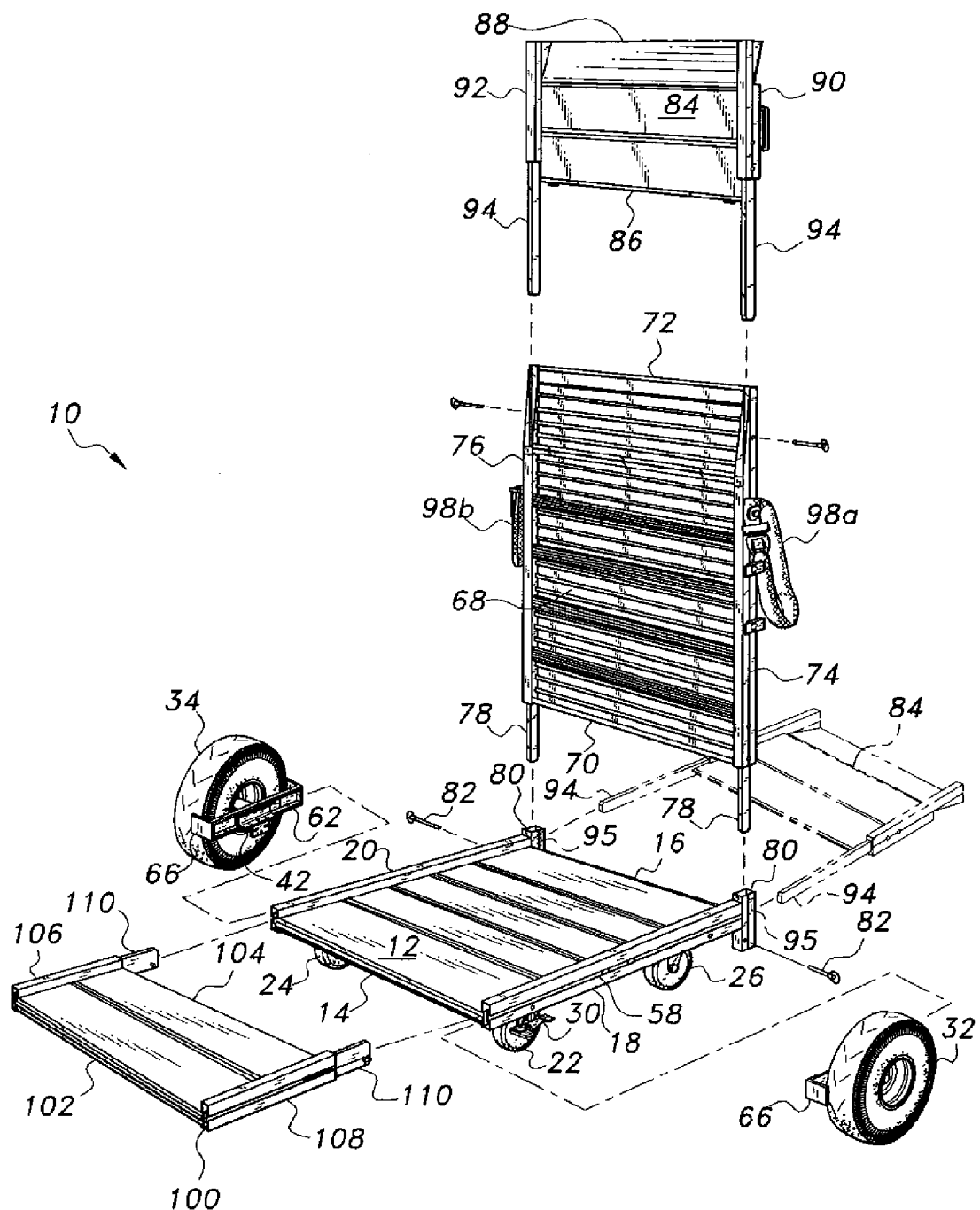
FIG. 1 is an exploded perspective view of a modular dolly according to the present invention, illustrating its basic components.
Figure 2:
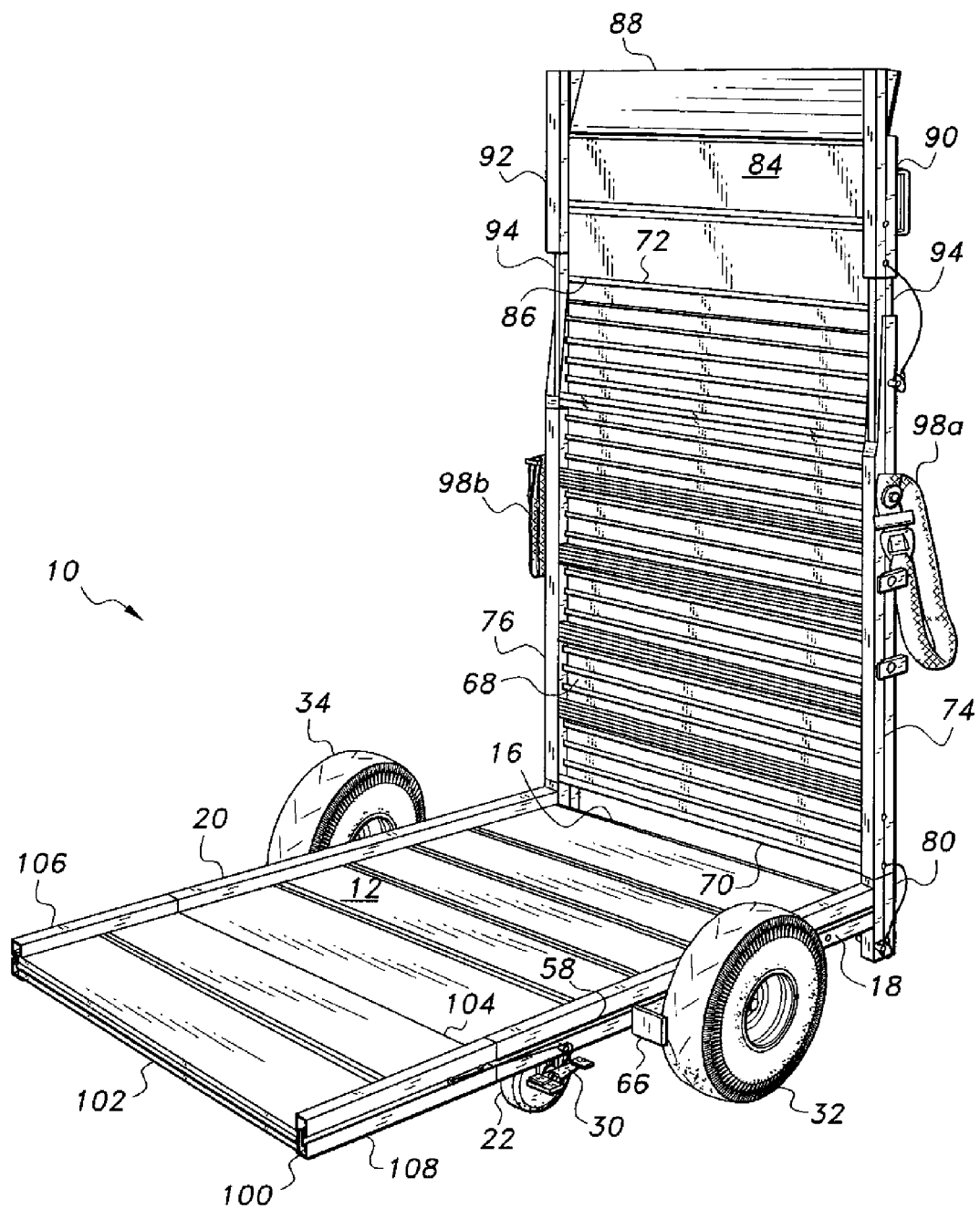
FIG. 2 is a perspective view of the assembled dolly of FIG. 1.

The modular dolly is adapted for the transport of relatively large, heavy, and bulky articles, e.g., office machines such as copiers, etc. FIG. 1 of the drawings provides an exploded perspective view of the dolly 10 illustrating the basic removable or separable components thereof, while FIG. 2 illustrates the assembled dolly 10. The modular dolly 10 includes a platform 12 having opposite first and second ends, respectively 14 and 16, and opposite first and second sides or side members, respectively 18 and 20. The platform 12 is constructed of a series of extruded panels with additional hollow beam extrusions forming the two side members 18 and 20.

Figure 10:
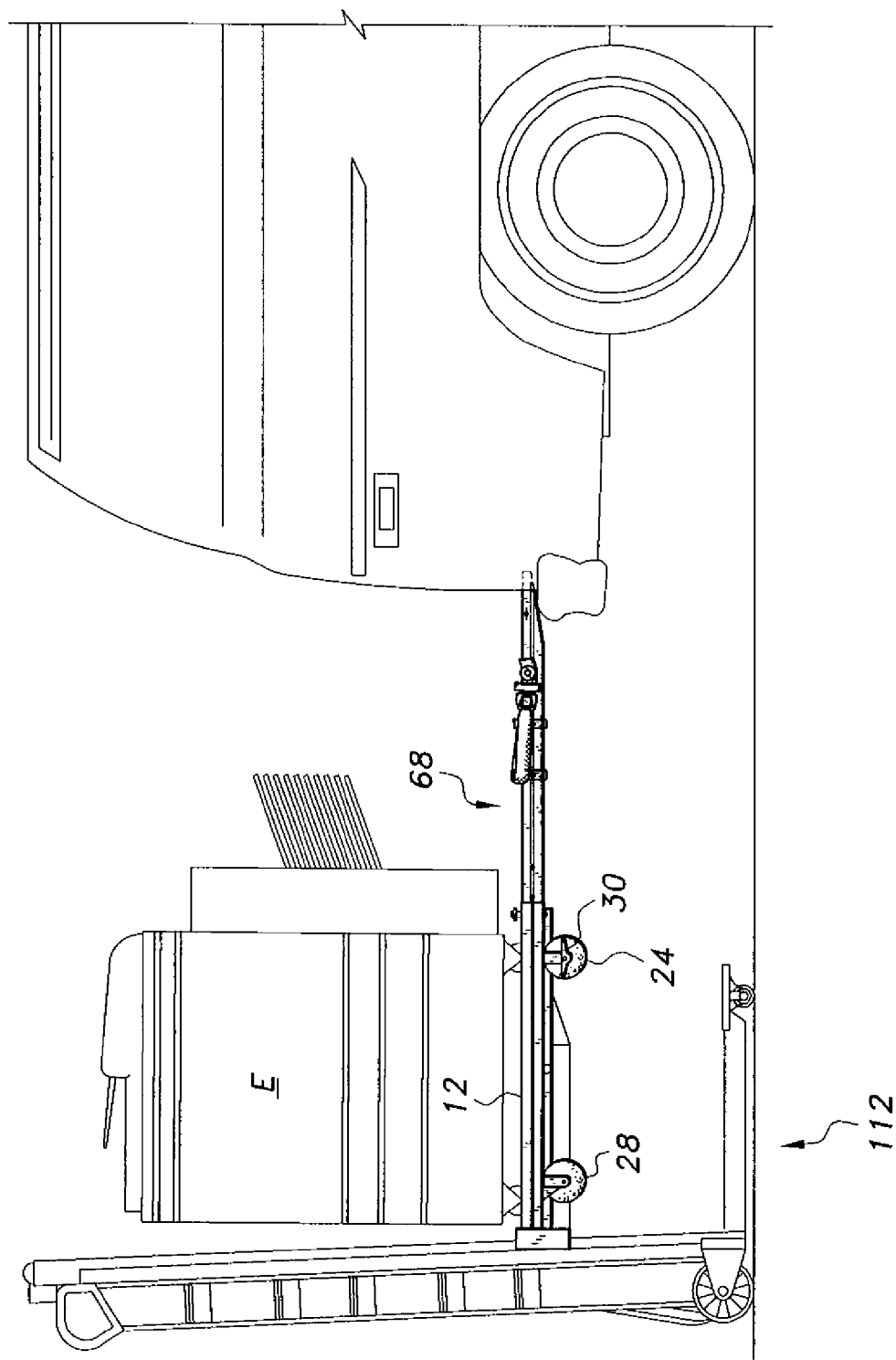
FIG. 10 is an environmental side elevation view of a modular dolly according to the present invention, showing the dolly lifted by the hand truck and using one of the platform modules of the dolly as loading bridge or ramp.

Four relatively small wheels are provided beneath the platform 12, with two of the wheels 22 and 24 depending from beneath the first end 14 of the platform 12 and the other two wheels 26, 28 depending from beneath the second end 16 of the platform; wheel 28 is shown in FIG. 10. The first end wheels 22, 24 may be non-castering, i.e., directionally fixed, but each of these first end wheels preferably includes a conventional lever actuated brake mechanism 30. The opposite second end wheels 26, 28 are caster or swiveling wheels, and do not necessarily include brakes. The four smaller diameter wheels 22 through 28 are preferably formed as solid discs of hard rubber or other suitable material.

Figure 3:
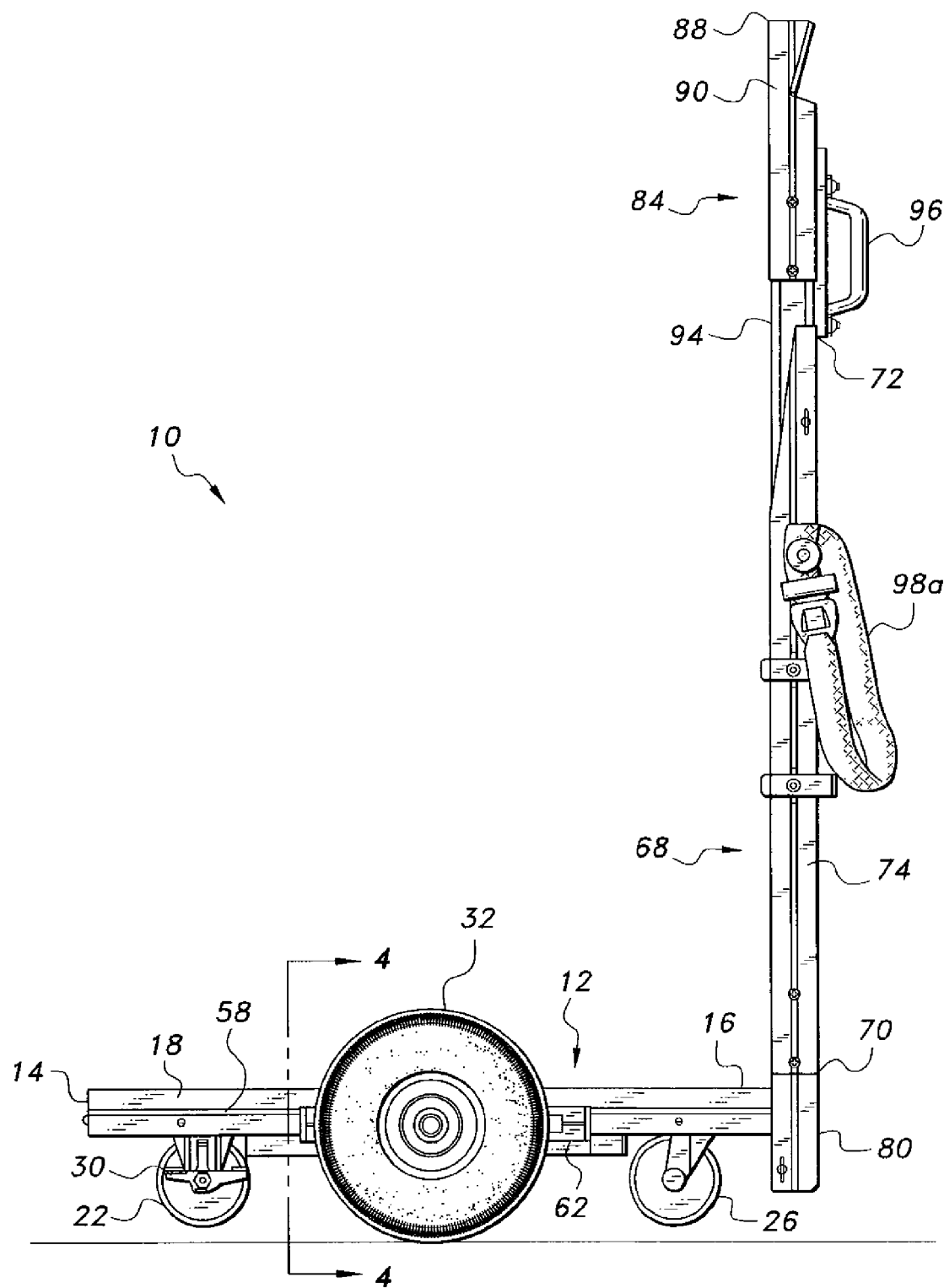
FIG. 3 is a side elevation view of the assembled dolly of FIGS. 1 and 2.

Additional removable wheel assemblies are provided to facilitate movement of the dolly 10 over rough, soft, and/or uneven surfaces. First and second auxiliary wheel assemblies, respectively 32 and 34, removably attach to the first and second sides 18 and 20 of the platform 12, respectively. The two auxiliary wheel assemblies 32, 34 have considerably larger diameters than the four relatively small permanently installed wheels 22 through 28. Even though the axles of the auxiliary wheels 32, 34 are essentially coplanar with the platform 12 while the axles of the smaller permanent wheels 22 through 28 are below the platform, the considerably larger diameters of the auxiliary wheel assemblies 32, 34 result in the bottoms of those wheels, when installed, extending below the bottoms of the smaller permanent wheels, as shown in FIG. 3 of the drawings. The larger diameters of the auxiliary wheels and their location substantially at the medial point of the platform 12 allow the auxiliary wheel assemblies 32, 34 to support the entire dolly 10 and any load thereon while the smaller, permanently installed wheels 22 through 28 remain clear of the underlying surface, generally as shown in FIG. 3 of the drawings. The larger diameter auxiliary wheel assemblies provide greatly reduced rolling resistance over relatively rough, soft, and/or uneven surfaces, in comparison to the smaller diameter (and narrower) permanently installed wheels 22 through 28.

Figure 4:
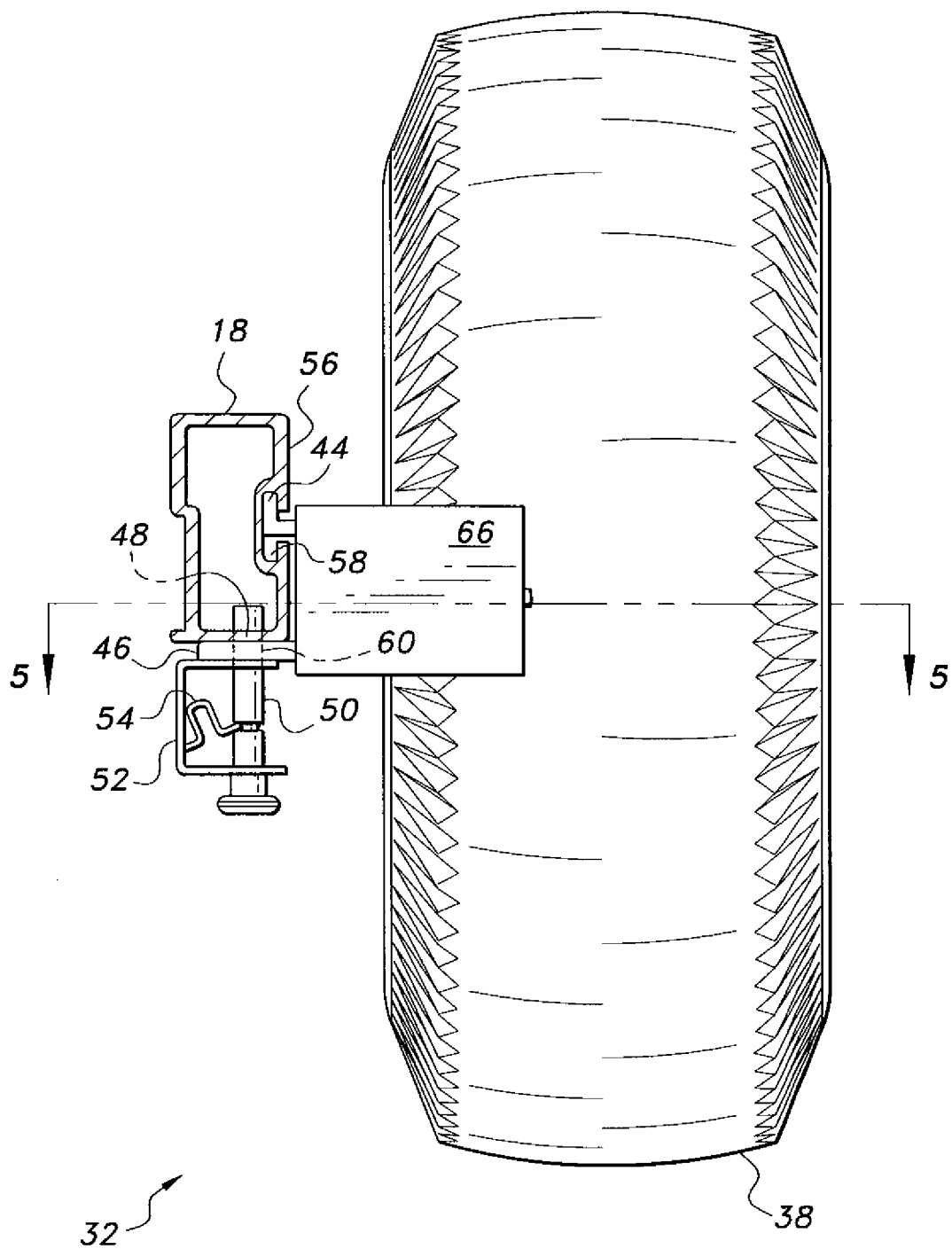
FIG. 4 is a partial section view along lines 4-4 of FIG. 3, showing details of the removable auxiliary wheel attachment.
Figure 5:
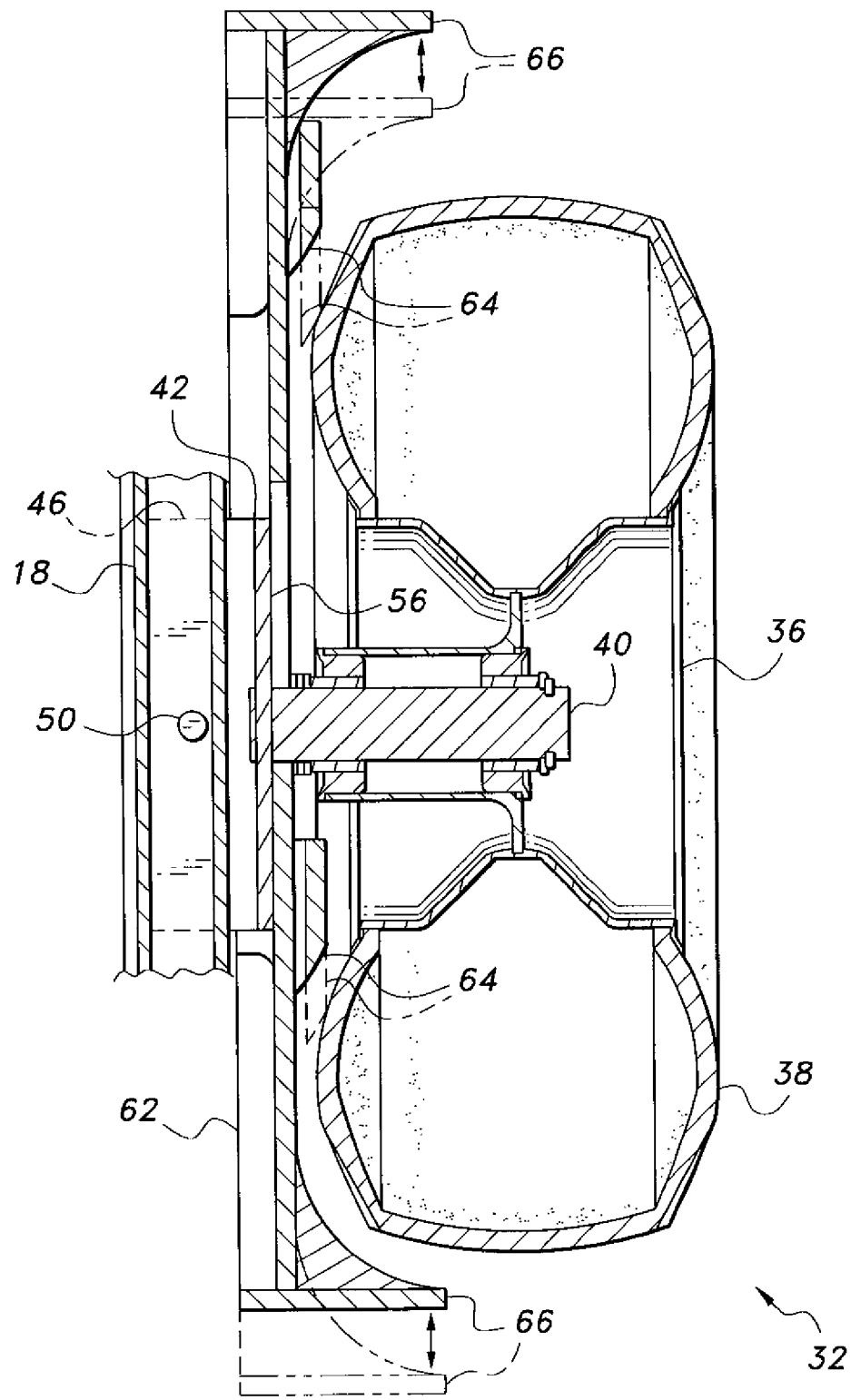
FIG. 5 is a section view along lines 5-5 of FIG. 4, showing details of the brake apparatus for an auxiliary wheel.

FIGS. 4 and 5 provide detailed views of the structure of the first auxiliary wheel assembly 32, with it being understood that the second auxiliary wheel assembly 34 is a mirror image of the first assembly 32. Each wheel assembly 32, 34 is pneumatic, as generally shown in the section view of FIG. 5, i.e., having a wheel hub 36 with a pneumatic tire 38 installed thereon. Each of the wheel assemblies 32, 34 includes an axle 40 (FIG. 5) affixed normal to and extending outwardly from a generally L-section platform attachment member 42. The platform attachment member 42 includes a longitudinal channel-engaging track 44 (FIG. 4) extending therealong, and a plate 46 extending therefrom and forming one leg of the L. The plate 46 includes a passage 60 therethrough. A pin 50 is selectively insertable into and through the passage 60. A bracket 52 depends from the plate 46. The pin 50 is secured in the bracket 52 by a spring 54. The spring 54 selectively holds the pin 50 in either a wheel-securing position (as shown in FIG. 5) wherein the pin 50 is held upwardly by the spring 54 to engage a lower passage 48 in the side member 18 or 20 of the platform 12 (as described below), or is held downwardly in a release position clear of the side member passage 48 to allow the removal of the wheel assembly from the platform 12.

Each of the two sides 18 and 20 of the platform 12 is of a hollow, generally rectangular configuration, with the two sides 18, 20 being mirror images of one another. Each side, e.g., the first side 18 shown in section in FIG. 4, includes an outer face 56 with a longitudinal channel 58 formed therein, with the lower passage 48 formed through the bottom surface or wall of the side member or beam 18. Each wheel assembly 32, 34 is attached to its respective side member 18, 20 generally as shown in FIG. 1 of the drawings. The channel-engaging track 44 of the platform attachment member 42 slides into the channel 58 of the side member, e.g., side member 18, from the first end 14 of the platform 12. The wheel assembly, e.g., assembly 32, is then slid rearwardly along the side member until the hole or passage 60 of the platform attachment plate 46 aligns with the corresponding hole or passage 48 through the bottom wall of the side member 18. The pin 50 is then pushed home through the two passages 48 and 60, to lock the wheel assembly 32 along the side member 18. The pin 50 may be pushed inwardly before the two holes 48 and 60 align, with the spring 54 snapping the pin into the hole 48 of the side member bottom wall when the two holes or passages 48 and 60 align.

Brakes are provided on the two auxiliary wheel assemblies 32 and 34, with FIG. 5 particularly showing the details of the brake assembly for the first auxiliary wheel assembly 32. A brake bar 62 slides longitudinally fore and aft relative to the axle 40 and other wheel assembly structure. The brake bar 62 includes a pair of tire contacts or shoes 64 that make contact with the inboard sidewall of the tire 38 when the brake is engaged, as shown in broken lines in FIG. 5. A kick plate 66 is provided at each end of the brake bar 62, for the operator of the modular dolly 10 to kick the brake bar 62 forward to engage the brake shoes 64 with the tire 38 as shown in broken lines in FIG. 5, or to kick the brake bar 62 rearwardly to release the brakes, as shown in solid lines.

A relatively large primary ramp 68 may be removably affixed to either end of the platform 12, as desired. The primary ramp 68 has an area approximately the same size as that of the platform 12 and a width equal thereto and includes a first end 70, opposite second end 72, first side 74, and opposite second side 76. The primary ramp 68 is formed in much the same manner as the platform 12, i.e., using a series of extruded panels with a hollow beam extrusion forming each side member.

The hollow extrusions of the side members 74, 76 provide for the insertion and permanent, immovably affixed attachment of a tine 78 therein and extending therefrom at the first end 70 of the primary ramp 68. Each of the side members 18 and 20 of the platform 12 includes a socket 80 at the second end of the platform, with the sockets 80 formed of tubular material having essentially the same cross sectional dimensions and configuration as the platform side members 18 and 20. The two sockets 80 are normal to the orientation of the side members 18 and 20, and provide for the removable installation of the corresponding tines 78 extending from the primary ramp 68. This allows the primary ramp 68 to be removably affixed to the second end 16 of the platform 12 and normal thereto, as shown in FIGS. 2, 3, 9, and 11. Retaining pins 82 may be provided to prevent unintentional removal of the tines 78 from the sockets 80.

The hollow cores of the two side members 18 and 20 of the platform 12 also permit the tines 78 to be removably installed therein at the first end 14 of the platform. The installation of the tines 78 within the side members 74, 76 of the primary ramp 68 and into the side members 18, 20 of the platform 12 assures that the primary ramp 68 will be substantially coplanar with the platform 12 when assembled thereto, as shown in FIGS. 6 through 8 and 10. As in the attachment of the primary ramp 68 to the second end 16 of the platform 12, retaining pins (not shown, but essentially the same as the pins 82 at the second end of the platform 12) may be used to provide positive attachment of the primary ramp 68 to the first end 14 of the platform 12.

A shorter auxiliary ramp 84 may be provided In addition to the primary ramp 68, if so desired. The auxiliary ramp 84 is constructed similarly to the platform 12 and primary ramp 68, i.e., formed of a series of extruded panels and having opposite first and second ends 86, 88 and opposite first and second sides or side members 90, 92. The side members 90, 92 are of the same configuration as the side members 18, 20 of the platform 12 and side members 74, 76 of the primary ramp 68. A tine 94 extends from each side member 90 and 92, with the tines 94 providing for the attachment of the auxiliary ramp 84 to the platform 12 or primary ramp 68 as desired. The auxiliary ramp tines 94 are somewhat longer than the primary ramp tines 78, due to the beveled second end portions of the side members 74 and 76 of the primary ramp 68 to allow the second end 72 of the ramp 68 to rest essentially level with the underlying surface when deployed.

Figure 6:
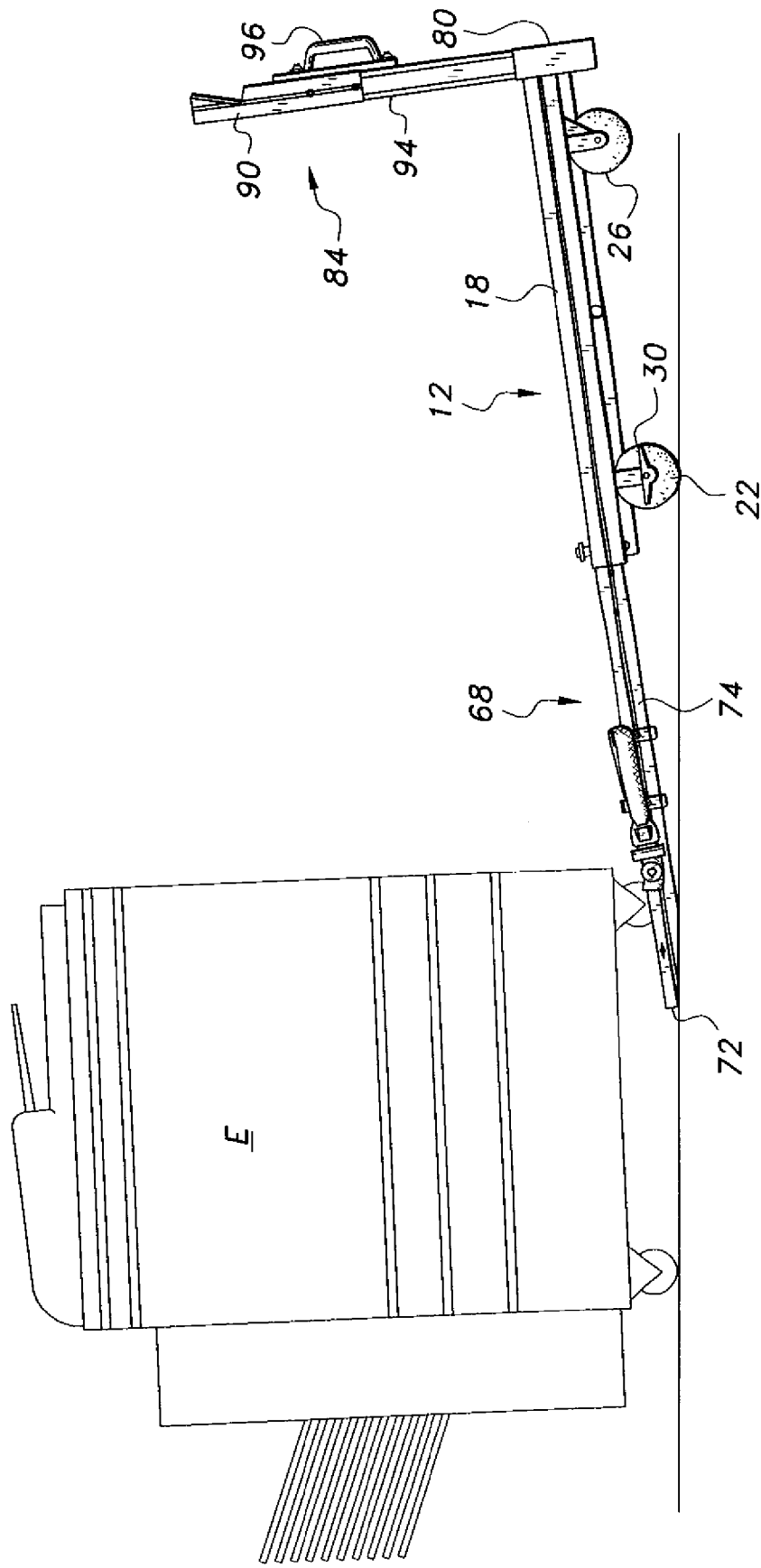
FIG. 6 is an environmental side elevation view of a modular dolly according to the present invention, showing the initial step in the loading of a large appliance onto the dolly.
Figure 7:
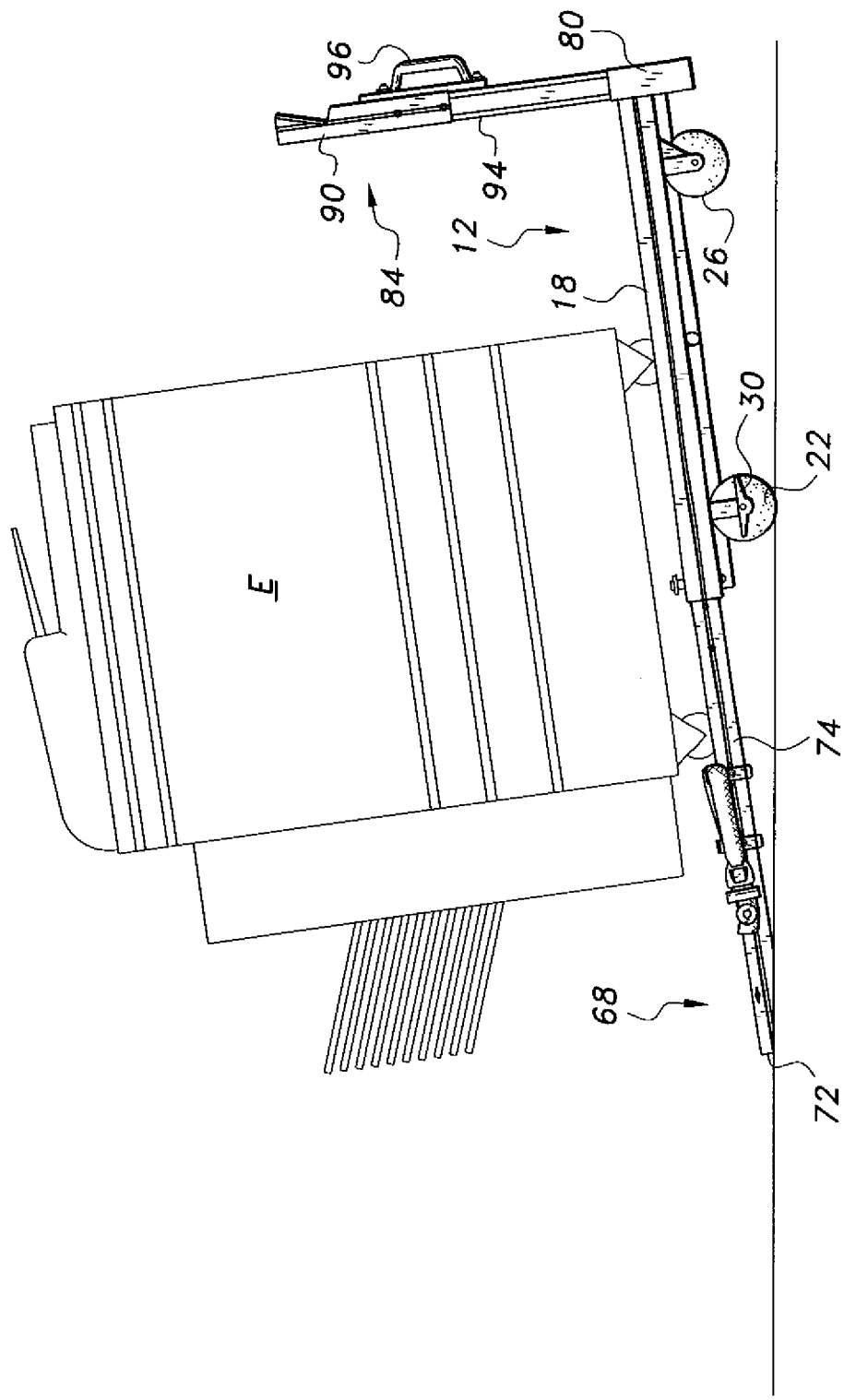
FIG. 7 is an environmental side elevation view of a modular dolly according to the present invention, showing a subsequent step in the loading of the large appliance onto the dolly.
Figure 8:
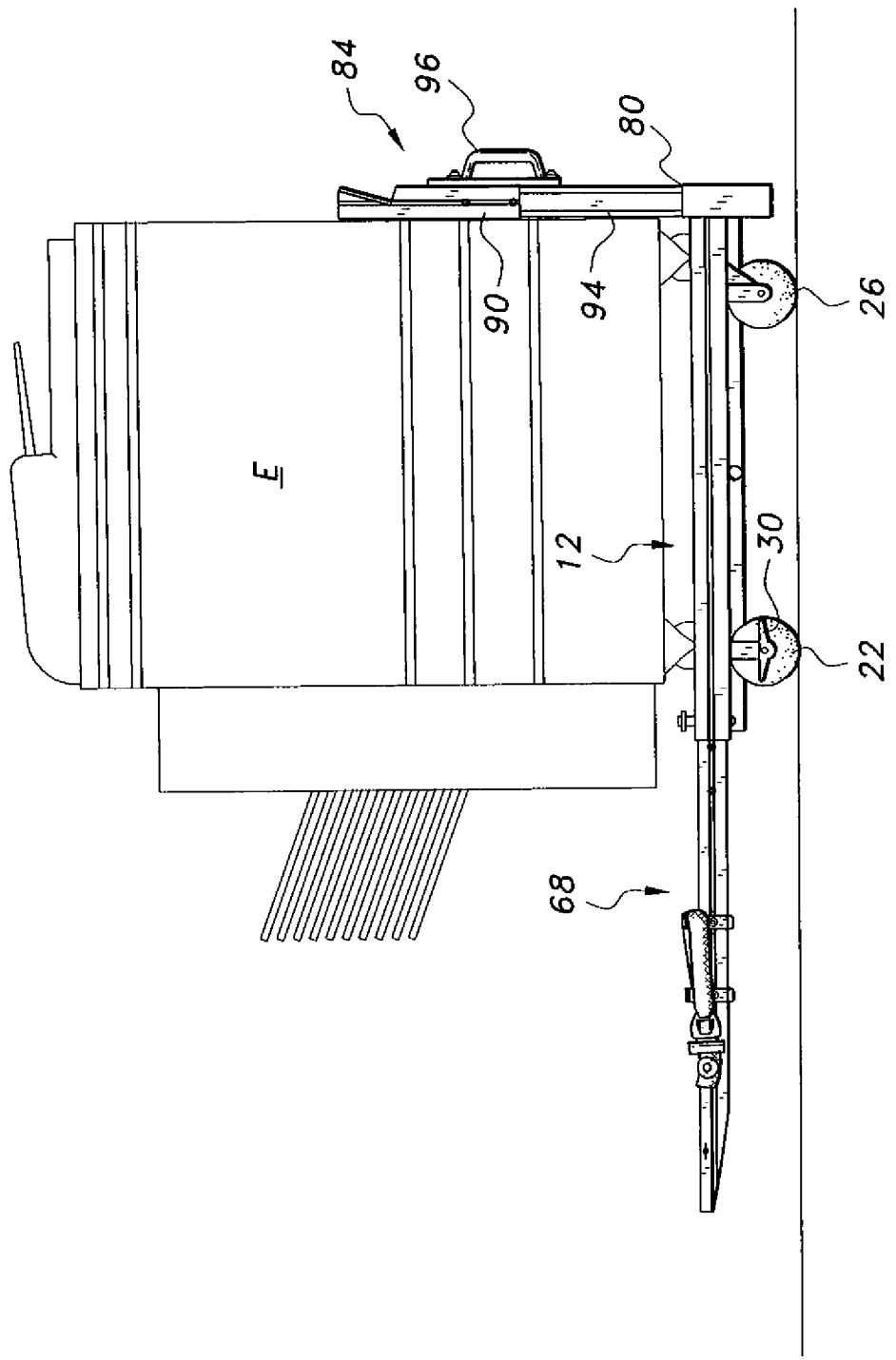
FIG. 8 is an environmental side elevation view of a modular dolly according to the present invention.

The auxiliary ramp 84 may be secured coplanar to the second end 72 of the primary ramp 68 if so desired, as shown in FIGS. 1 through 3. The assembly of the primary and auxiliary ramps 68 and 84 may be used to provide a longer ramp length where required, or to extend the height of the assembly when used as a backstop normal to the platform 12, as shown in FIGS. 2 and 3. One or more handles 96 (shown in FIG. 3) may be provided on the back side of the auxiliary ramp 84, to facilitate maneuvering the modular dolly 10 when the ramp assembly is installed as shown in FIGS. 2 and 3. Alternatively, the auxiliary ramp 84 may be installed directly in the sockets 80 at the second end 16 of the platform 12 and normal thereto to serve as a short backstop to prevent a load from rolling beyond the second end 16 of the platform during loading operations when the primary ramp 68 is extended from the first end 14 of the platform, as shown in FIGS. 6 through 8. A further alternative auxiliary ramp 84 installation is shown in broken lines in FIG. 1. A slot 95 may be provided in the rear of each of the sockets 80 at the second end 16 of the platform 12, to accept the tines 94 of the auxiliary ramp 84. The tines 94 pass through the slots 95 and into the hollow cores of the two side members 18 and 20 of the platform 12. The tines 94 are locked in place in the respective side members 18 and 20 by retaining pins 82.

In addition to the primary and auxiliary ramps 68 and 84, an optional extension ramp 100 may be added to the platform 12, if so desired, as illustrated in FIGS. 1 and 2. The extension ramp 100 is constructed and configured similarly to the platform 12 and the primary and auxiliary ramps 68 and 84, i.e., the extension ramp 100 is formed of extruded panels and has opposite first and second ends 102, 104 and opposite first and second sides or side members 106, 108. The side members 106, 108 are of the same configuration as the side members 18, 20 of the platform 12 and side members 74, 76 of the primary ramp 68 and side members 90, 92 of the auxiliary ramp 84. A tine 110 extends from each side member 106 and 108. The tines 110 provide for selective attachment of the auxiliary ramp 100 to the platform 12 or primary ramp 68 (if sufficient length is provided for the auxiliary ramp tines 110), if desired, in the manner described further above for the removable attachment of the primary ramp 68 to the platform 12 and the auxiliary ramp 84 to the primary ramp 68.

FIGS. 6 through 8 illustrate the basic procedure in loading a large, heavy, and/or bulky article of equipment E, e.g., a console copy machine, etc., onto the modular dolly 10. In FIGS. 6 through 8, the primary ramp 68 has been installed to the first end of the platform 12, and extends outwardly therefrom and coplanar therewith. The modular dolly 10 is relatively lightweight, particularly in comparison to a conventional console size article of equipment E such as a console copier or the like. Moreover, the length of the primary ramp 68 when installed to extend coplanar with the platform 12 acts as a relatively long lever arm about the first end wheels 22 and 24, which serve as a fulcrum. Thus, the weight and lever arm of the primary ramp 68 will cause the distal or second end 72 of the primary ramp 68 to drop to the underlying surface to facilitate loading operations, pivoting the assembly about the first end wheels 22 and 24 and raising the opposite second end wheels 26 and 28 and second end of the platform 12 above the underlying surface, even without the placement of a load on the primary ramp 68. When the second end 72 of the primary ramp 68 is lowered to the underlying surface, the weight of the equipment E resting thereon provides additional stability for the tilted assembly, as shown in FIG. 6.

The beveled ends of the side members 74, 76 allow the second end 72, or more precisely the floor of the ramp 68 at the second end thereof, to rest directly upon the underlying surface with a minimal lip or discontinuity to negotiate with the equipment E. Large, heavy, and/or bulky articles of equipment E such as large copy machines, etc., are typically equipped with very small rollers or casters, typically on the order of about two inches in diameter, more or less. In some cases the equipment may not have any wheels, and it may be necessary to load the equipment onto a small dolly for movement onto the modular dolly 10. Such smaller dollies are also conventionally equipped with quite small wheels, with the beveled ends of the side members 74, 76 of the primary ramp 68 facilitating the transfer of the equipment (or dolly upon which it may rest) onto the modular dolly 10.

In FIG. 7, the equipment load E has been moved farther along the auxiliary ramp 68 so that approximately half of its weight is resting on the auxiliary ramp 68 and half is resting upon the platform 12. At this point, the load is very nearly balanced over the first end wheels 22 and 24. As the equipment E is moved closer to the opposite second end of the platform 12, the center of gravity of the equipment E and dolly 10 shifts to a point between the first end wheels 22, 24 and the second end wheels 26, 28, thus lowering the second end wheels 26, 28 to the underlying surface and leveling the platform 12. The leveling of the platform 12 facilitates the completion of the positioning of the equipment E thereon, generally as shown in FIG. 8 of the drawings. The auxiliary ramp 84 was previously installed in the sockets 80 at the second end of the platform 12, with the auxiliary ramp 84 serving as a stop to prevent the movement of the equipment E past the second end of the platform 12.

Figure 9:
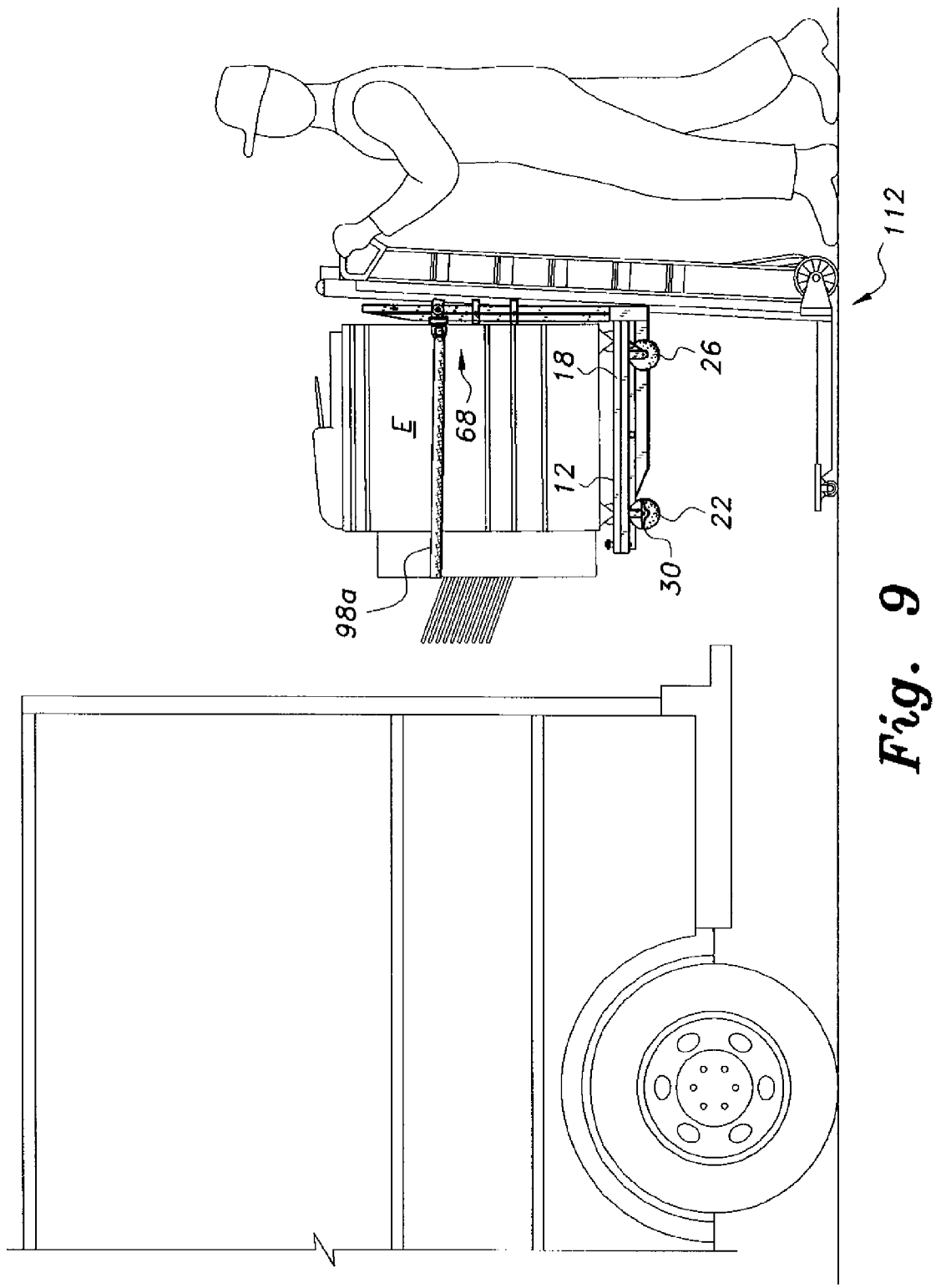
FIG. 9 is an environmental side elevation view of a modular dolly according to the present invention, showing the dolly and its load being lifted by a hand truck having load-lifting capability.
Figure 11:
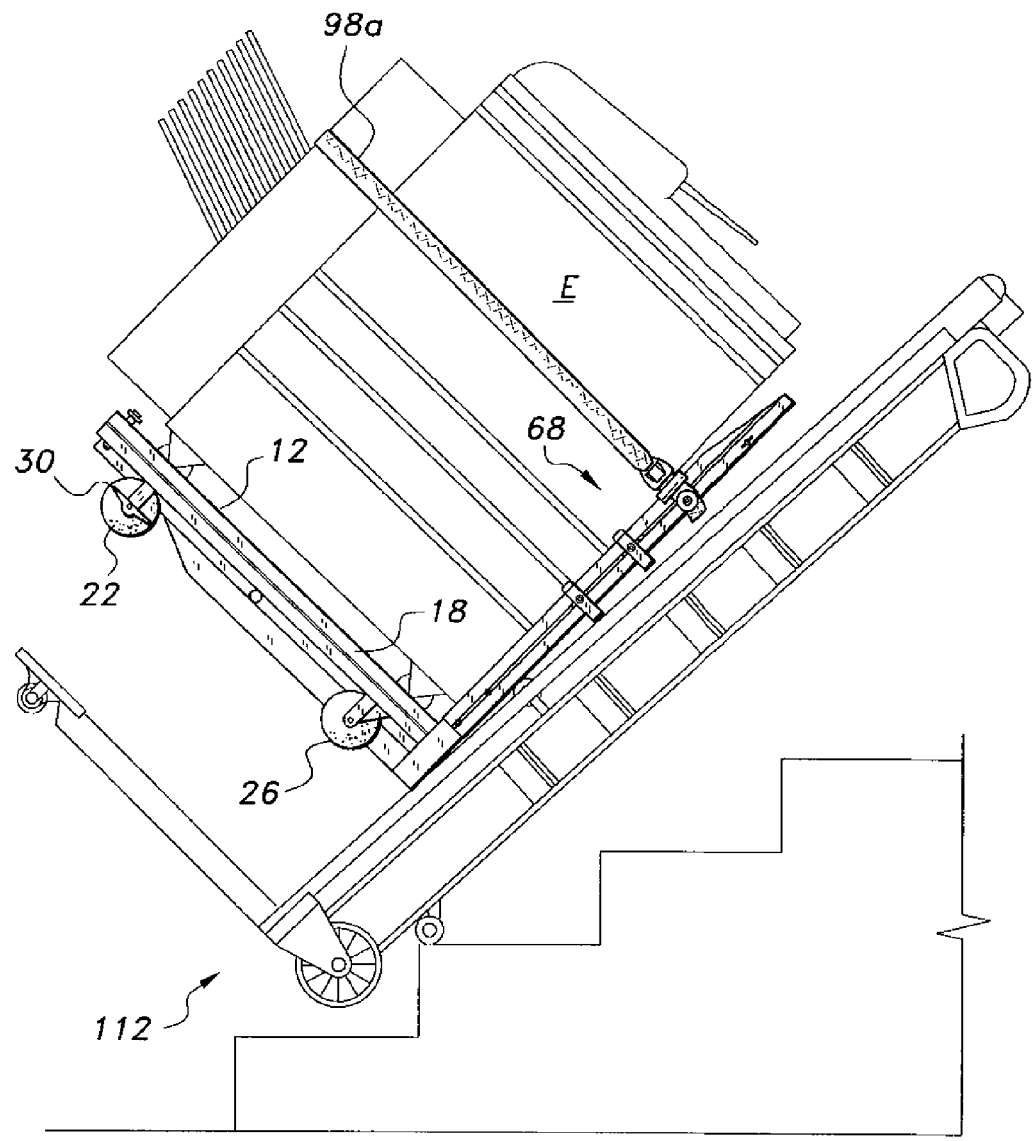
FIG. 11 is an environmental side elevation view of a modular dolly according to the present invention, showing the dolly loaded onto a stair-climbing hand truck, negotiating a flight of stairs.

Once the equipment E has been positioned atop the platform 12 as desired, the auxiliary ramp 84 may be removed from the platform sockets 80 and the primary ramp 68 installed therein, generally as shown in FIGS. 2, 3, 9, and 11. The primary ramp 68 includes a cargo strap for securing the equipment E or other load on the dolly 10. A first portion 98a of the strap is attached to and extends from the first side 74 of the primary ramp 68, with a second portion 98b attached to and extending from the opposite second side 76 of the primary ramp. The two strap portions 98a, 98b are preferably conventional, having mating buckle or latch and tongue attachments and adjustment for length as is typically found in such installations. The cargo strap portions 98a, 98b are secured about the equipment E or other load generally as shown in FIGS. 9 and 11 to prevent the equipment from rolling from the first end 14 of the platform 12 during transport of the equipment E and dolly 10.

Once the equipment E has been loaded and secured to the modular dolly 10, the dolly may be used to transport the equipment E to a truck or other suitable vehicle for further transport as required. The platform 12 of the dolly 10 has a relatively low height above the underlying surface, even with the auxiliary wheels 32 and 34 installed thereon. Accordingly, it will generally be necessary to elevate the dolly 10 so the platform 12 is level with the floor or bed of the truck or other vehicle used to transport the equipment E. This may be accomplished by loading the dolly 10 onto a hand truck capable of elevating or lifting the dolly 10 to the height of the truck floor, generally as shown in FIG. 9. Such hand trucks are well known, and the exemplary hand truck 112 illustrated in FIGS. 9 through 11 is also capable of climbing steps or stairs to facilitate the movement of the equipment to or from an upper level in a building, where no other practicable means is provided for doing so. Such a stair climbing hand truck is disclosed in U.S. Patent Application Publication No. 2006/0182578, published on Aug. 17, 2006, which is hereby incorporated by reference in its entirety.

In many instances it may be necessary to bridge some difficult terrain between the modular dolly 10 or hand truck 112 and the transport vehicle. This may be accomplished by placing the dolly 10 on the hand truck 112 generally as shown in FIG. 10, and extending the primary ramp 68 from the first end of the platform 12. The hand truck 112 is used to elevate the platform 12 and its extended primary ramp 68 to a level even with the floor of the truck or vehicle, whereupon the hand truck 112 may be maneuvered to place the distal second end 72 of the primary ramp 68 on or over the rear bumper or the edge of the rear floor of the vehicle, generally as shown in FIG. 10.

In FIG. 11, the modular dolly 10 is shown loaded onto the stair climbing hand truck 112 and being transported up a flight of stairs. The stair climbing hand truck 112 incorporates a set of supplementary wheels or rollers that are adjustable along the length or height of the hand truck, and which may be progressively positioned on the treads of the steps to raise the load up the steps. The heights or positions of the supplementary wheels can be lowered relative to the hand truck 112 by an electric motor installed with the hand truck, thereby raising the hand truck relative to the wheels to lift the load up the steps. Reversing the procedure allows the load to be lowered down the steps.

Accordingly, it will be seen that the modular dolly 10 with its various attachments greatly facilitates the movement and transport of large, heavy, and/or bulky articles of equipment. The stair climbing hand truck incorporated therewith further facilitates such operations. While a console copier is shown herein as an exemplary article of equipment, it will be understood that the use of the modular dolly 10 and hand truck 112 are not limited to such use, but may be used to move and transport innumerable articles having considerable size, bulk, and/or weight. Moreover, the versatility of the modular nature of the dolly 10 and its various components allow the device to be adapted to various other uses in addition to those illustrated, e.g., as a ramp between a vehicle and the surface or another vehicle, etc., as desired.

It is to be understood that the present invention is not limited to the embodiments described above, but encompasses any and all embodiments within the scope of the following claims.

I claim:

1. A modular dolly adapted for movement along an underlying surface, comprising:
a platform having a first end, a second end opposite the first end, a first side, and a second side opposite the first side, wherein each side of the platform includes a longitudinal member having an outer face defining a longitudinal channel and a lower passage formed therein;
first and second non-steerable wheels disposed beneath the first end of the platform, each of the non-steerable wheels having a brake;
first and second caster wheels disposed beneath the second end of the platform;
first and second auxiliary wheel assemblies medially and removably disposed to the first and second sides of the platform, respectively, the auxiliary wheel assemblies having larger diameters than the non-steerable wheels and the caster wheels, the auxiliary wheel assemblies supporting the non-steerable wheels and the caster wheels clear of the underlying surface when the auxiliary wheel assemblies are installed upon the platform and the platform is generally parallel to the underlying surface, each of the auxiliary wheel assemblies has an axle and a platform attachment member extending from the axle normal thereto, the platform attachment member having:
a channel-engaging track extending therefrom, the track selectively engaging the channel of the longitudinal member of the platform; and
a plate extending therefrom, the plate having a passage formed therethrough;
a primary ramp having a first end, a second end opposite the first end, a first side, and a second side opposite the first side, the primary ramp being selectively attached to the platform; and
a pin selectively inserted through the passage in the plate extending from the platform attachment member and the lower passage in the longitudinal member to secure the auxiliary wheel assembly to the platform, the pin being removed to a release position to remove the auxiliary wheel assembly.

2. The modular dolly according to claim 1 further including an auxiliary ramp having a first end, a second end opposite the first end, a first side, and a second side opposite the first side, the auxiliary ramp being shorter than the primary ramp, the auxiliary ramp being selectively attached to the primary ramp or to the platform.

3. The modular dolly according to claim 1, further including a stair-climbing hand truck in combination therewith.

4. The modular dolly according to claim 1, further including a brake bar slidably extending from each of the auxiliary wheel assemblies, the brake bar being selectively positioned between a wheel-braking position and a brake release position.

5. The modular dolly according to claim 1, wherein:
each of the non-steerable wheels and the caster wheels is formed as a solid component; and
each of the auxiliary wheel assemblies comprises a wheel hub and a pneumatic tire installed thereon.

6. The modular dolly according to claim 1, further including a cargo strap having a first portion extending from the first side of the platform and a second portion extending from the second side of the platform.

7. A modular dolly adapted for movement along an underlying surface, comprising:
a platform having a first end, a second end opposite the first end, a first side, and a second side opposite the first side, each side of the platform includes a longitudinal member having an outer face defining a longitudinal channel and a lower passage formed therein;

first and second auxiliary wheel assemblies removably disposed on the first and second sides of the platform, respectively, the auxiliary wheel assemblies having larger diameters than the non-steerable wheels and the caster wheels, the auxiliary wheel assemblies supporting the non-steerable wheels and the caster wheels clear of the underlying surface when the auxiliary wheel assemblies are installed upon the platform and the platform is generally parallel to the underlying surface, each of the auxiliary wheel assemblies has an axle and a platform attachment member extending from the axle normal thereto, the platform attachment member having:

a channel-engaging track extending therefrom, the track selectively engaging the channel of the longitudinal member of the platform; and a plate extending therefrom, the plate having a passage formed therethrough;

a pin selectively inserted through the passage in the plate extending from the platform attachment member and the lower passage in the longitudinal member to secure the auxiliary wheel assembly to the platform, the pin being removed to a release position to remove the auxiliary wheel assembly;

first and second non-steerable wheels disposed beneath the first end of the platform, each of the non-steerable wheels having a brake;

first and second caster wheels disposed beneath the second end of the platform;

a primary ramp having a first end, a second end opposite the first end, a first side, and a second side opposite the first side, the primary ramp being selectively attached to the platform; and an auxiliary ramp having a first end, a second end opposite the first end, a first side, and a second side opposite the first side, the auxiliary ramp being shorter than the primary ramp, the auxiliary ramp being selectively attached to the primary ramp or to the platform.

8. The modular dolly according to claim 7, further including a brake bar slidably extending from each of the auxiliary wheel assemblies, the brake bar being selectively positioned between a wheel-braking position and a brake release position.

9. The modular dolly according to claim 8, wherein:

each of the non-steerable wheels and the caster wheels is formed as a solid component; and each of the auxiliary wheel assemblies comprises a wheel hub and a pneumatic tire installed thereon.

10. The modular dolly according to claim 7, further including a stair-climbing hand truck in combination therewith.

11. The modular dolly according to claim 7, further including a cargo strap having a first portion extending from the first side of the platform and a second portion extending from the second side of the platform.

* * * * *